United States Patent
Hwang et al.

(10) Patent No.: US 6,934,078 B2
(45) Date of Patent: Aug. 23, 2005

(54) DISPERSION-COMPENSATED ERBIUM-DOPED FIBER AMPLIFIER

(75) Inventors: Seong-Taek Hwang, Pyongtaek-shi (KR); Sung-Tae Kim, Suwon-shi (KR); Sung-Jin Park, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 228 days.

(21) Appl. No.: 10/299,306

(22) Filed: Nov. 19, 2002

(65) Prior Publication Data

US 2003/0169481 A1 Sep. 11, 2003

(30) Foreign Application Priority Data

Mar. 7, 2002 (KR) ........................................ 2002-12067

(51) Int. Cl.[7] .............................................. H04B 10/12
(52) U.S. Cl. ................ 359/341.32; 359/337.5
(58) Field of Search ....................... 359/341.32, 341.33, 359/337.5

(56) References Cited

U.S. PATENT DOCUMENTS

| | | | | |
|---|---|---|---|---|
| 5,673,280 A | * | 9/1997 | Grubb et al. ................. | 372/3 |
| 6,335,820 B1 | * | 1/2002 | Islam .......................... | 359/334 |
| 6,657,785 B2 | * | 12/2003 | Ducellier et al. ........... | 359/484 |
| 2002/0008901 A1 | * | 1/2002 | Kinoshita ................. | 359/341.1 |

* cited by examiner

Primary Examiner—Bernarr E. Gregory
Assistant Examiner—Eric Bolda
(74) Attorney, Agent, or Firm—Cha & Reiter, LLC.

(57) ABSTRACT

Disclosed is dispersion-compensated erbium-doped fiber amplifier. The disclosed fiber amplifier comprises a first fiber amplifying unit, a second fiber amplifying unit arranged downstream from the first fiber amplifying unit while being connected in series to the first fiber amplifying unit, an optical fiber connected in parallel between the first and second fiber amplifying units and adapted to re-use a residual light, remaining after an amplification operation of the first fiber amplifying unit, as a pumping light for the second fiber amplifying unit, a fiber reflector for reflecting an optical signal amplified in the second fiber amplifying unit, thereby causing the reflected optical signal to flow backward towards the second fiber amplifying unit, a circulator for guiding the amplified optical signal, reflected to flow backward by the fiber reflector and dispersion-compensated by a dispersion compensating fiber, to flow along a path different from that of the amplified optical signal applied to the circulator while preventing an amplified spontaneous emission (ASE) generated during an amplification operation of the second fiber amplifying unit from flowing backward towards the first fiber amplifying unit, and the dispersion compensating fiber is arranged between the circulator and the second fiber amplifying unit and adapted to compensate for dispersion of the amplified optical signal.

21 Claims, 5 Drawing Sheets

DISPERSION-COMPENSATED ERBIUM-DOPED FIBER AMPLIFIER

CLAIM OF PRIORITY

This application claims priority to an application entitled "DISPERSION COMPENSATED ERBIUM DOPED FIBER AMPLIFIER" filed in the Korean Industrial Property Office on Mar. 7, 2002 and assigned Serial No. 2002-12067, the contents of which are hereby incorporated by reference.

BACKGROUND OF THE INVENTION

1. Field of the Invention

The present invention relates to an erbium-doped fiber amplifier using erbium as an amplification medium, and more particularly to a dispersion-compensated erbium-doped fiber amplifier using a dispersion-compensated optical fiber.

2. Description of the Related Art

In response to the greatly increased amount of data being transmitted, recently-developed wavelength division multiplexing (WDM) optical communication systems have increased their transmission capacities. Such an increase in transmission capacity can be achieved by increasing the number of transmission channels, or, by increasing the rate of data transmission. Currently, increasing the rate of data transmission is the method of choice and can provide a data transmission rate increased from 2.5 Gb/s up to 10 Gb/s. In order to realize a higher data transmission rate, a number of research efforts are ongoing.

Dispersion effects are severely increased at a transmission rate of 10 Gb/s or more. Accordingly, dispersion compensating fibers are used in order to compensate for the dispersion that occurs during a transmission procedure. However, where such a dispersion compensating fiber is used, it is also necessary to additionally use an optical fiber amplifier in order to compensate for the accompanying additional loss of optical signal power.

Figure 1:
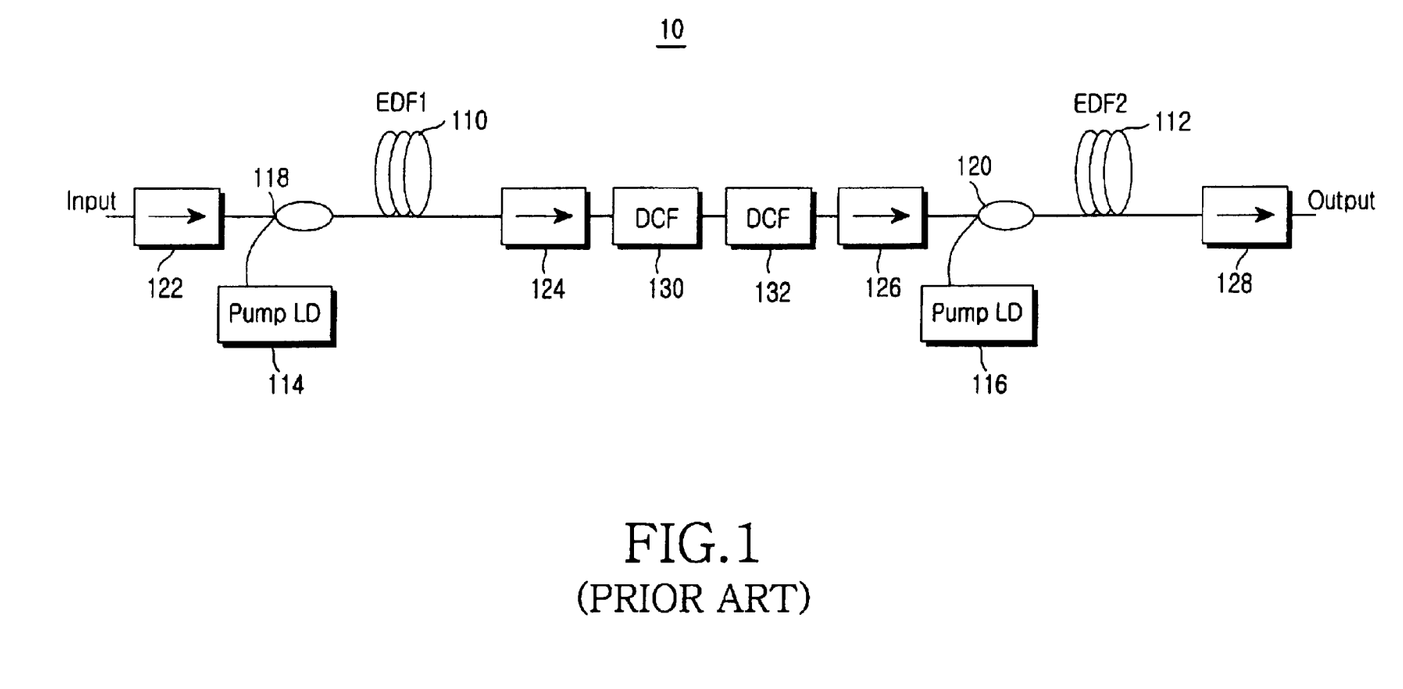
FIG. 1 illustrates the configuration of a prior art dispersion-compensated erbium-doped fiber amplifier.

FIG. 1 illustrates a prior art dispersion-compensated erbium-doped fiber amplifier 10. As shown in FIG. 1, the prior art dispersion-compensated erbium-doped fiber amplifier 10 has a dispersion compensating configuration including a first and second erbium-doped fiber 110 and 112, connected to each other in series, and a first and second dispersion compensating fiber 130 and 132 arranged between the first and second erbium-doped fibers 110 and 112, and connected to the first and second erbium-doped fibers 110 and 112 in series while being connected to each other in series. The fiber amplifier 10 supplies a first pumping light to the first erbium-doped fiber 110 in a forward fashion via a first wavelength selective coupler 118, while supplying a second pumping light to the second erbium-doped fiber 112 in a forward fashion via a second wavelength selective coupler 120, in order to amplify optical signals flowing through the fibers 110 and 112. When a pumping light is supplied to the first or second erbium-doped fiber 110 or 112, the erbium ions maintained in a ground state in the fiber are excited by the pumping light. As the excited erbium ions are induced to be emitted in accordance with an inversion thereof, optical signals are subjected to an amplification procedure while passing through the fiber. During the amplification procedure, an amplified spontaneous emission (ASE) is generated. First through fourth isolators 122, 124, 126 and 128 are provided to cut off backward flowing of the ASE while allowing the amplified optical signal to flow forward.

In WDM communication systems using a transmission rate of 10 Gb/s or more, however, it is necessary to use a dispersion compensating fiber for dispersion compensation, and a fiber amplifier for compensating for loss of optical signals caused by the use of the dispersion compensating fiber. Where the number of nodes in a network having a ring architecture is increased, or the transmission distance in a long-distance transmission system is increased, the numbers of dispersion compensating fibers and dispersion compensating fiber amplifiers required in the transmission system are correspondingly increased. When the number of components increases the cost of manufacturing is also increased whereas the reliability of the system decreases.

SUMMARY OF THE INVENTION

Therefore, there is a need for a dispersion-compensated erbium-doped fiber amplifier which uses reduced numbers of dispersion compensating fibers and amplifiers, thereby achieving a reduction in manufacturing costs and avoiding a decrease in reliability that accompanies any increase in the number of components.

In a first embodiment, the present invention provides a dispersion-compensated erbium-doped fiber amplifier comprising a first fiber amplifying unit and a second fiber amplifying unit arranged downstream from the first fiber amplifying unit while being connected in series to the first fiber amplifying unit. An optical fiber is connected in parallel between the first and second fiber amplifying unit and is adapted to re-use a residual light, remaining after an amplification operation of the first fiber amplifying unit, as a pumping light for the second fiber amplifying unit. A fiber reflector reflects an optical signal amplified in the second fiber amplifying unit, thereby causing the reflected optical signal to flow backward towards the second fiber amplifying unit. A circulator guides the amplified optical signal, reflected to flow backward by the fiber reflector and dispersion-compensated by a dispersion compensating fiber, to flow along a path different from that of the amplified optical signal applied to the circulator while preventing an amplified spontaneous emission generated during an amplification operation of the second fiber amplifying unit from flowing backward towards the first fiber amplifying unit. A dispersion compensating fiber is arranged between the circulator and the second fiber amplifying unit and adapted to compensate for dispersion of the amplified optical signal.

In a second embodiment, the present invention provides a dispersion-compensated erbium-doped fiber amplifier comprising a first fiber amplifying unit, a second fiber amplifying unit arranged downstream from the first fiber amplifying unit while being connected in series to the first fiber amplifying unit, and an optical fiber connected in parallel between the first and second fiber amplifying units and adapted to re-use a residual light remaining after an amplification operation of the first fiber amplifying unit, as a pumping light for the second fiber amplifying unit. A fiber reflector reflects an optical signal amplified in the second fiber amplifying unit, thereby causing the reflected optical signal to flow backward towards the second fiber amplifying unit. A circulator separates the amplified optical signal, reflected to flow backward by the fiber reflector and dispersion-compensated by a dispersion compensating fiber, to flow towards an output stage along a path different from that of the amplified optical signal applied to the circulator while preventing an amplified spontaneous emission generated during an amplification operation of the second fiber amplifying unit from flowing backward towards the first fiber amplifying unit. The dispersion compensating fiber arranged between the second fiber amplifying unit and the fiber reflector is adapted to compensate for dispersion of a forward optical signal amplified by the first fiber amplifying unit while compensating again for dispersion of the optical signal reflected to flow backward by the fiber reflector.

In a third embodiment, the present invention provides a dispersion-compensated erbium-doped fiber amplifier comprising a first fiber amplifying unit and a second fiber amplifying unit arranged downstream from the first fiber amplifying unit while being connected in series to the first fiber amplifying unit. A third fiber amplifying unit is arranged downstream from the second fiber amplifying unit while being connected in series to the second fiber amplifying unit. An optical fiber is connected in parallel between the second and third fiber amplifying unit via a first and second wavelength selective coupler and is adapted to re-use a residual light, remaining after an amplification operation of the second fiber amplifying unit, as a pumping light for the third fiber amplifying unit. A fiber reflector is arranged downstream from the third fiber amplifying unit, and is adapted to reflect an optical signal amplified in the third fiber amplifying unit and dispersion-compensated by a dispersion compensating fiber, thereby causing the reflected optical signal to flow backward towards the third fiber amplifying unit. A circulator is arranged between the first and second fiber amplifying unit, and is adapted to separate the amplified/dispersion-compensated optical signal, reflected to flow backward by the fiber reflector, to flow towards an output stage along a path different from that of the amplified/dispersion-compensated optical signal applied to the circulator while preventing an amplified spontaneous emission generated during an amplification operation of the second fiber amplifying unit from flowing backward towards the first fiber amplifying unit. The dispersion compensating fiber is arranged between the wavelength selective couplers and is adapted to compensate for dispersion of a forward optical signal amplified by the second fiber amplifying unit while compensating again for dispersion of the amplified/dispersion-compensated optical signal flowing backward towards the third fiber amplifying unit.

In a fourth embodiment, the present invention provides a dispersion-compensated erbium-doped fiber amplifier comprising a first fiber amplifying unit and a second fiber amplifying unit arranged downstream from the first fiber amplifying unit while being connected in series to the first fiber amplifying unit. An optical fiber is connected in parallel between the first and second fiber amplifying unit via a first and second wavelength selective coupler and is adapted to re-use a residual light, remaining after an amplification operation of the first fiber amplifying unit, as a pumping light for the second fiber amplifying unit. The optical fiber comprises an fiber reflector adapted to reflect an optical signal amplified in the first fiber amplifying unit and dispersion-compensated by a dispersion compensating fiber, thereby causing the reflected optical signal to flow backward towards the second fiber amplifying unit. A circulator is arranged between the first and second wavelength selective coupler, and is adapted to separate the amplified/dispersion-compensated optical signal, reflected to flow backward by the fiber reflector, to flow towards an output stage along a path different from that of the amplified/dispersion-compensated optical signal applied to the circulator, while preventing an amplified spontaneous emission generated during an amplification operation of the second fiber amplifying unit from flowing backward towards the first fiber amplifying unit. The dispersion compensating fiber arranged between the circulator and the reflector is adapted to compensate for dispersion of the amplified optical signal applied thereto while compensating again for dispersion of the amplified/dispersion-compensated optical signal flowing backward by the reflector.

DETAILED DESCRIPTION OF THE PREFERRED EMBODIMENT

Figure 2:
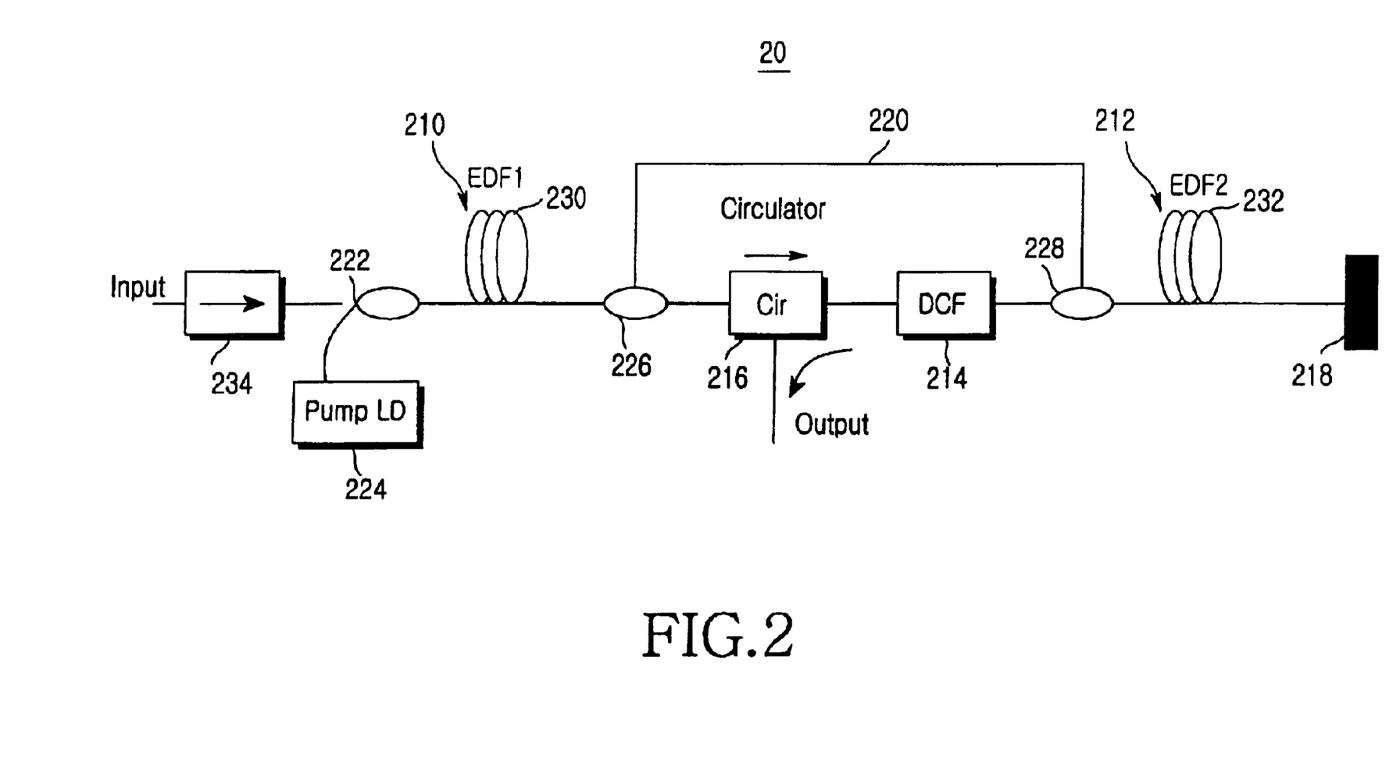
FIG. 2 illustrates a dispersion-compensated erbium-doped fiber amplifier according to a first embodiment of the present invention.

FIG. 2 illustrates a dispersion-compensated erbium-doped fiber amplifier according to a first embodiment of the present invention. As shown in FIG. 2, the fiber amplifier 20, comprises a first and second amplifying unit 210 and 212, connected in series. In the illustrated first embodiment of the present invention, a residual light, remaining after an amplification operation of the first fiber amplifying unit 210, is re-used as a pumping light for the second fiber amplifying unit 212. In accordance with this embodiment, a configuration for compensating for dispersion of amplified optical signals two times is also implemented by arranging a dispersion compensating fiber 214 between the first and second fiber amplifying units 210 and 212. Preferably, the dispersion compensating fiber 214 in the erbium-doped fiber amplifier 20 is arranged to maximize the signal-to-noise ratio based on Rayleigh back-scattering. The signal-to-noise ratio means the intensity difference between the Rayleigh back-scattered beam and the signal light. Generally, the Rayleigh back-scattering occurs due to reflection of light caused at upstream and downstream ends of the dispersion compensating fiber. Typically, the intensity of light reflected at the upstream end of the dispersion compensating fiber is higher than the intensity of light reflected at the downstream end of the dispersion compensating fiber. Accordingly, the dispersion-compensated erbium-doped fiber amplifier 20 is configured to prevent the reflected beam from passing through the amplification medium, thereby preventing an amplification of the reflected beam while amplifying only the signal light, in order to increase the intensity difference between the Rayleigh-back-scattered beam and the signal light. The fiber amplifier shown in FIG. 2 exhibits a signal-to-noise ratio higher than that of FIG. 3.

The first fiber amplifying unit 210 in the dispersion-compensated erbium-doped fiber amplifier 20 serves to amplify an input optical signal, using a pumping light supplied from a pumping laser diode 224 via a first wavelength selective coupler 222. The second fiber amplifying unit 212 is arranged downstream from the first fiber amplifying unit 210 while being connected to the first fiber amplifying unit 210 in series. The dispersion-compensated erbium-doped fiber amplifier 20 further comprises an optical fiber 220 connected in parallel between the first and second fiber amplifying unit 210 and 212 via second and third wavelength selective couplers 226 and 228, and adapted to supply a residual light, remaining after an amplification operation of the first fiber amplifying unit 210, to the second fiber amplifying unit 212 as a forward pumping light for the second fiber amplifying unit 212. The dispersion-compensated erbium-doped fiber amplifier 20 further comprises a fiber reflector 218 for reflecting an optical signal amplified in the second fiber amplifying unit 212, thereby causing the reflected optical signal to flow backward towards the second fiber amplifying unit 212, a circulator 216 for guiding an amplified/dispersion-compensated optical signal, reflected to flow backward by the fiber reflector 218, to flow towards an output stage, and a dispersion compensating fiber (DCF) 214 disposed between the circulator 216 and the third wavelength selective coupler 228, and adapted to compensate for dispersion of the amplified optical signal.

The circulator 216 is disposed between the second and third wavelength selective couplers 226 and 228. The circulator 216 guides an optical signal amplified by the first fiber amplifying unit 210 to flow forward towards the second fiber amplifying unit 212, while separating an amplified/dispersion-compensated optical signal reflected to flow backward by the fiber reflector 218, and then guiding the separated optical signal to flow towards the output stage. The reflector 218 has full-reflection characteristics with respect to optical signals applied thereto. The dispersion compensating fiber 214 compensates for dispersion of the forward optical signal amplified by the first fiber amplifying unit 210 while compensating for dispersion of the backward optical signal reflected to flow backward by the fiber reflector 218. That is, the amplified optical signal passes through one dispersion compensating fiber 214 two times, that is, in forward and backward directions. The circulator 216 also prevents the ASE generated during the amplification procedure from flowing backward towards the first fiber amplifying unit 210.

The dispersion compensating fiber 214 comprises a 40 Km dispersion compensating fiber exhibiting an insertion loss of 6 dB so as to compensate for a dispersion corresponding to a general single-mode fiber for communications having a length of 80 Km. The fiber reflector 218 is configured to fully reflect an optical signal applied thereto.

Preferably, the first fiber amplifying unit 210 comprises a first erbium-doped fiber (EDF1) 230 for performing an amplification operation for an optical signal applied thereto, using a pumping light supplied from the pumping laser diode 224 via the first wavelength selective coupler 222. The second fiber amplifying unit 212 comprises a second erbium-doped fiber (EDF2) 232 for performing an amplification operation for an optical signal applied thereto, using a pumping light that is a residual light supplied from the first fiber amplifying unit 210 via the optical fiber 220. An isolator 234 is also provided to make the input optical signal flow forward.

Figure 3:
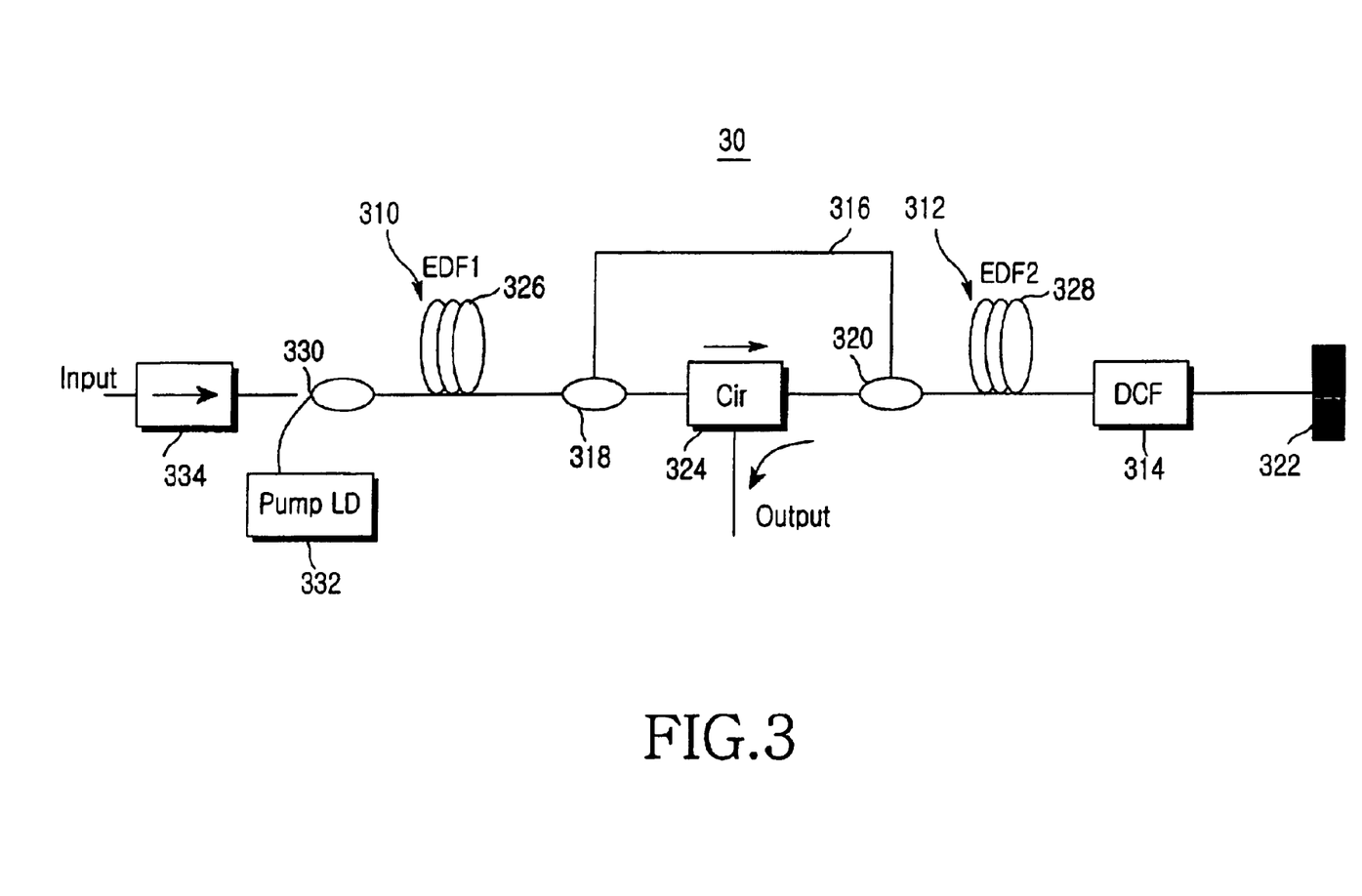
FIG. 3 illustrates a dispersion-compensated erbium-doped fiber amplifier according to a second embodiment of the present invention.

FIG. 3 illustrates a dispersion-compensated erbium-doped fiber amplifier 30 according to a second embodiment of the present invention. As shown in FIG. 3, the fiber amplifier comprises a first and second fiber amplifying unit 310 and 312, and re-using means for re-using a residual light remaining after an amplification operation of the first fiber amplifying unit 310 as a pumping light for the second fiber amplifying unit 312. A dispersion compensating fiber 314 is arranged downstream from the second fiber amplifying unit 312 while being connected to the second fiber amplifying unit 312 in series. A fiber reflector 322 is also provided to make a reflected optical signal pass through the dispersion compensating fiber 314. The reflector 322 has full-reflection characteristics with respect to optical signals applied thereto.

The first fiber amplifying unit 310 in the dispersion-compensated erbium-doped fiber amplifier 30 serves to amplify an input optical signal using a pumping light supplied from a pumping laser diode 332 via a first wavelength selective coupler 330. The second fiber amplifying unit 312 is arranged downstream from the first fiber amplifying unit 310 while being connected to the first fiber amplifying unit 310 in series. The dispersion-compensated erbium-doped fiber amplifier 30 also comprises an optical fiber 316 adapted to supply a residual light, remaining after an amplification operation of the first fiber amplifying unit 310, to the second fiber amplifying unit 312 as a forward pumping light for the second fiber amplifying unit 312. The dispersion-compensated erbium-doped fiber amplifier 30 further comprises a fiber reflector 322 for reflecting an optical signal amplified in the second fiber amplifying unit 312, thereby causing the reflected optical signal to flow backward, a circulator 324 for guiding an amplified/dispersion-compensated optical signal, reflected to flow backward by the fiber reflector 322, to flow towards an output stage, and a dispersion compensating fiber (DCF) 314 adapted to compensate for dispersion of the forward optical signal amplified by the first fiber amplifying unit 310 while compensating for dispersion of the backward amplified/dispersion-compensated optical signal reflected to flow backward by the fiber reflector 322.

The optical fiber 316 is connected between the first and second fiber amplifying units 310 and 312 via a second and third wave selective coupler 318 and 320. Preferably, the optical fiber 316 is connected in parallel between the first and second fiber amplifying unit 310 and 312. The circulator 324 is arranged between the second and third wavelength selective coupler 318 and 320. The circulator 324 guides an optical signal amplified by the first fiber amplifying unit 210 to flow forward towards the second fiber amplifying unit 312 while separating an amplified/dispersion-compensated optical signal reflected to flow backward by the fiber reflector 322, and then guides the separated optical signal to flow towards the output stage. The circulator 324 also serves to prevent the ASE generated during the amplification procedure from flowing backward towards the first fiber amplifying unit 310.

The dispersion compensating fiber 314 is arranged between the second fiber amplifying unit 312 and the fiber reflector 322 to compensate for color dispersion of the amplified optical signal, while compensating again for dispersion of the backward optical signal reflected to flow backward by the fiber reflector 322.

Preferably, the first fiber amplifying unit 310 comprises a first erbium-doped fiber (EDF1) 326 for performing an amplification operation for an optical signal applied thereto, using a pumping light supplied from the pumping laser diode 332 via the first wavelength selective coupler 330. The second fiber amplifying unit 312 comprises a second erbium-doped fiber (EDF2) 328 for performing an amplification operation for an optical signal applied thereto using a pumping light that is a residual light supplied from the first fiber amplifying unit 310 via the optical fiber 316. An isolator 334 is also provided to make the input optical signal flow forward.

Figure 4:
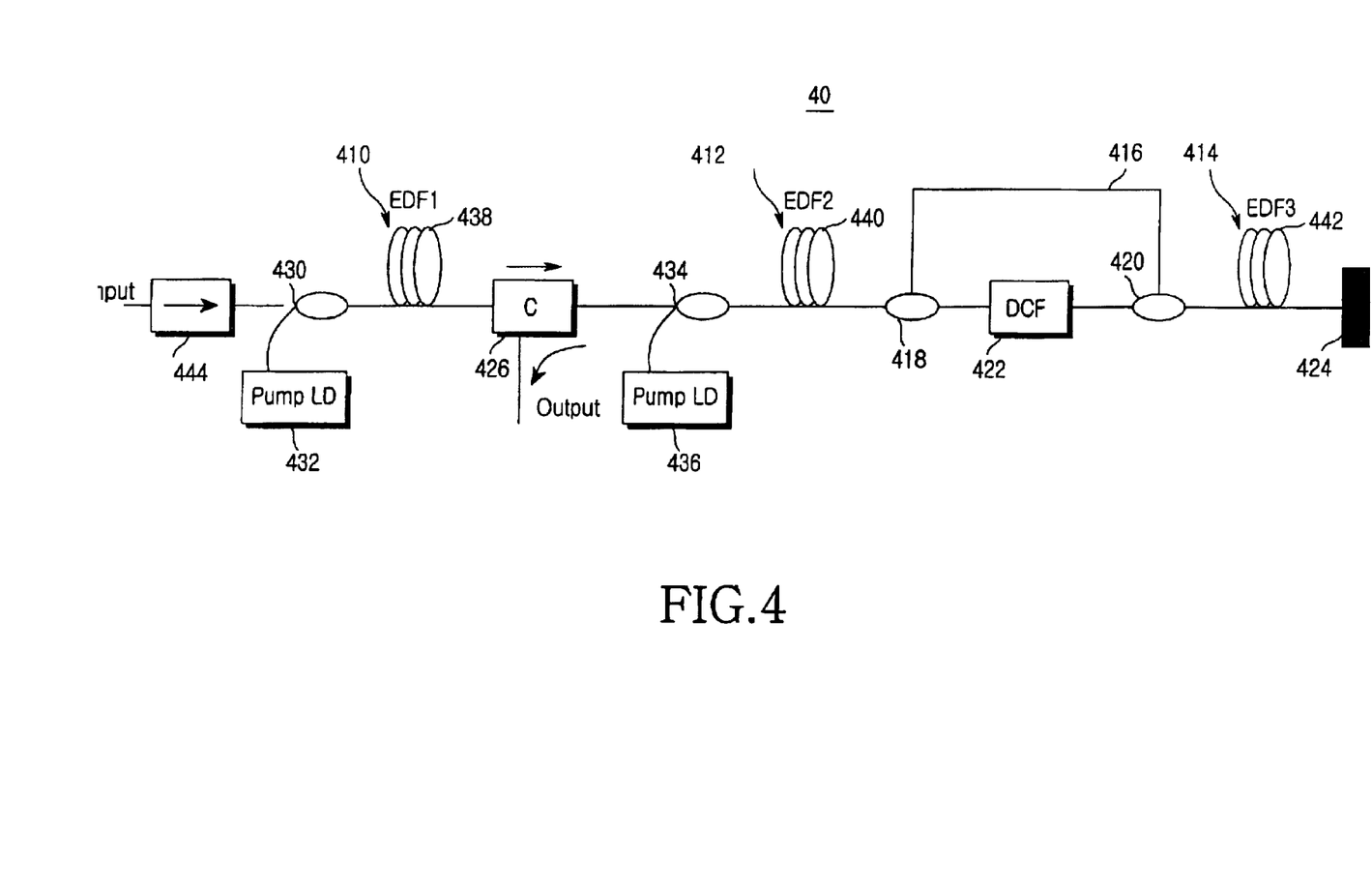
FIG. 4 illustrates a dispersion-compensated erbium-doped fiber amplifier according to a third embodiment of the present invention.

FIG. 4 illustrates a dispersion-compensated erbium-doped fiber amplifier according to a third embodiment of the present invention. As shown in FIG. 4, the fiber amplifier, which is denoted by the reference numeral 40, comprises three fiber amplifying units, that is, a first, second and third amplifying unit 410, 412, and 414 connected in series, and re-using means for re-using a residual light remaining after an amplification operation of the second fiber amplifying unit 412 as a pumping light for the third fiber amplifying unit 414. A dispersion compensating fiber 422 is arranged between the second fiber amplifying unit 412 and the third fiber amplifying unit 414 in order to compensate for dispersion of optical signals.

The dispersion-compensated erbium-doped fiber amplifier 40 also comprises an optical fiber 416 adapted to re-use a residual light, remaining after an amplification operation of the second fiber amplifying unit 412, as a forward pumping light for the third fiber amplifying unit 414. The dispersion-compensated erbium-doped fiber amplifier 40 further comprises a fiber reflector 424 for reflecting an optical signal amplified/dispersion-compensated through the third fiber amplifying unit 414, thereby causing the reflected optical signal to flow backward towards the third fiber amplifying unit 414, and a circulator 426 for separating the amplified/dispersion-compensated optical signal, reflected to flow backward by the fiber reflector 424, and causing the reflected signal to flow towards an output stage. The reflector 424 has full-reflection characteristics with respect to optical signals applied thereto.

The dispersion compensating fiber 422 compensates for dispersion of both the forward optical signal amplified by the second fiber amplifying unit 412, and the backward optical signal emerging backward from the third fiber amplifying unit 414.

The optical fiber 416 is connected between the second and third fiber amplifying units 412 and 414 via a first and second wave selective coupler 418 and 420. In particular, the optical fiber 416 is connected in parallel between the second and third fiber amplifying units 412 and 414. The circulator 426 is disposed between the first and second fiber amplifying units 410 and 412 to separate the amplified/dispersion-compensated optical signal, reflected to flow backward, and cause the reflected signal to flow towards the output stage. In particular, the circulator 426 serves to prevent the ASE generated during the amplification procedure from flowing backward towards the first fiber amplifying unit 410.

The dispersion compensating fiber 422 is arranged between the first and second wavelength selective couplers 418 and 420 to perform, two times, a compensation operation for forward optical signals flowing forward therethrough, and backward optical signals reflected to flow backward therethrough by the fiber reflector 424. In particular, the dispersion compensating fiber 422 compensates for color dispersion of the forward optical signal amplified by the second fiber amplifying unit 412, while compensating for dispersion of the backward optical signal reflected to flow backward towards the third fiber amplifying unit 414. The circulator 426 comprises three ports, that is, a port serving as an input terminal for the input optical signal amplified by the first fiber amplifying unit 410, a port serving as an output terminal for the optical signal subjected to amplification procedures respectively carried out by the first, second, and third fiber amplifying units, and subjected, two times, to a dispersion compensation, and a port serving as an input terminal for the optical signal amplified by the first fiber amplifying unit 410 while serving as an input terminal for the optical signal subjected, three times to the amplification, and subjected, two times to the dispersion compensation.

The first fiber amplifying unit 410 comprises a first erbium-doped fiber (EDF1) 438 for performing an amplification operation for an optical signal applied thereto, using a pumping light supplied from a first pumping laser diode 432 via a third wavelength selective coupler 430. The second fiber amplifying unit 412 comprises a second erbium-doped fiber (EDF2) 440 for performing an amplification operation for an optical signal applied thereto, using a pumping light supplied from a second pumping laser diode 436 via a fourth wavelength selective coupler 434. The third fiber amplifying unit 414 comprises a third erbium-doped fiber (EDF3) 442 for performing an amplification operation for an optical signal applied thereto, using a pumping light, that is, a residual light supplied from the second fiber amplifying unit 412 via the optical fiber 416.

The fiber reflector 424 is configured to fully reflect amplified/dispersion-compensated optical signals applied thereto.

Since the dispersion-compensated erbium-doped fiber amplifier 40 according to the third embodiment of the present invention comprises three fiber amplifying units, it can achieve a reduction in Rayleigh back-scattering while obtaining a high gain.

Figure 5:
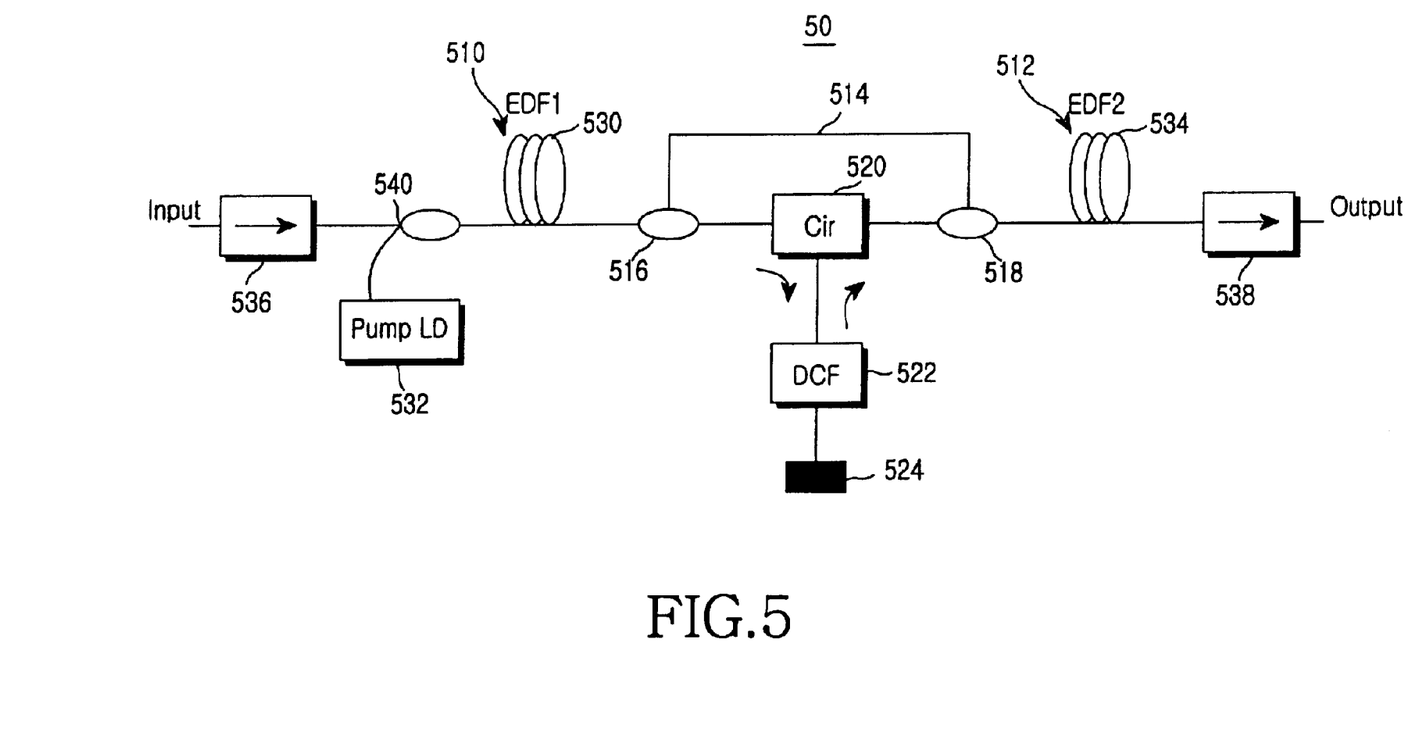
FIG. 5 illustrates a dispersion-compensated erbium-doped fiber amplifier according to a fourth embodiment of the present invention.

FIG. 5 illustrates a dispersion-compensated erbium-doped fiber amplifier 50 according to a fourth embodiment of the present invention. As shown in FIG. 5, the fiber amplifier 50, comprises a first and second amplifying unit 510 and 512, connected to each other in series. An optical fiber 514 is connected between the first and second amplifying unit 510 and 512 via a first and second wavelength selective coupler 516 and 518, in order to use a residual light remaining after an amplification operation of the first fiber amplifying unit 510 as a pumping light for the second fiber amplifying unit 512. A dispersion compensating fiber 522 is disposed between the first and second fiber amplifying unit 510 and 512, so that optical signals amplified two times pass through the dispersion compensating fiber 522.

In the dispersion-compensated erbium-doped fiber amplifier 50, the second fiber amplifying unit 512 is arranged downstream from the first fiber amplifying unit 510 while being connected in series to the first fiber amplifying unit 510. The optical fiber 514 serves to re-use a residual light remaining after an amplification operation of the first fiber amplifying unit 510 as a forward pumping light for the second fiber amplifying unit 512. The dispersion-compensated erbium-doped fiber amplifier 50 further comprises a fiber reflector 524 for reflecting an optical signal amplified/dispersion-compensated through the first fiber amplifying unit 510, and a circulator 520 for separating the amplified/dispersion-compensated optical signal, reflected to flow backward by the fiber reflector 524, and causing the reflected signal to flow towards an output stage. The reflector 524 has full-reflection characteristics with respect to optical signals applied thereto. The dispersion compensating fiber 522 is disposed between the circulator 520 and the fiber reflector 524. This dispersion compensating fiber 522 compensates for dispersion of the amplified optical signal while compensating again for dispersion of the amplified/dispersion-compensated optical signal reflected to flow backward by the fiber reflector 524.

The optical fiber 514 is connected in parallel between the first and second fiber amplifying units 510 and 512 via the first and second wavelength selective couplers 516 and 518. The circulator 520 is disposed between the first and second wavelength selective couplers 516 and 518 to guide the amplified optical fiber to flow towards the fiber reflector 524. The circulator 520 also separates the amplified/dispersion-compensated optical signal, reflected to flow backward by the fiber reflector 524, and causes the reflected signal to flow towards the output stage. In particular, the circulator 520 serves to prevent the ASE generated in the second fiber amplifying unit 512 from flowing backward towards the first fiber amplifying unit 510. The circulator 520 has three ports, that is, a port serving as an input terminal for the input optical signal amplified by the first fiber amplifying unit 510, a port serving as an output terminal for the amplified while serving as an input terminal for the reflected amplified/dispersion-compensated optical signal, and a port serving as an output terminal for the amplified/dispersion-compensated optical signal.

Preferably, the first fiber amplifying unit 510 comprises a first erbium-doped fiber (EDF1) 530 for performing an amplification operation for an optical signal applied thereto, using a pumping light supplied from the pumping laser diode 532 via a third wavelength selective coupler 540. The second fiber amplifying unit 512 comprises a second erbium-doped fiber (EDF2) 534 for performing an amplification operation for an optical signal applied thereto, using a pumping light, that is, a residual light supplied from the first fiber amplifying unit 510 via the optical fiber 514.

When an input optical signal is applied to the dispersion-compensated erbium-doped fiber amplifier 50, it is amplified in the first fiber amplifying unit 510 by a pumping light supplied from the pumping laser diode 532 connected to the first fiber amplifying unit 510 via the third wavelength selective coupler 540, while passing though the first fiber amplifying unit 510. The amplified optical signal is guided by the circulator 520 to flow towards the dispersion compensating fiber 522. Meanwhile, the residual light remaining after the amplification operation of the first fiber amplifying unit 510 is connected to the second fiber amplifying unit 512 via the first and second wavelength selective couplers 516 and 518. The amplified optical signal is compensated for color dispersion while passing through the dispersion compensating fiber 522. This amplified optical signal is reflected by the fiber reflector 524 to pass through the dispersion compensating fiber 522 again. Accordingly, the amplified optical signal is compensated again for color dispersion while passing through the dispersion compensating fiber 522. The amplified optical signal dispersion-compensated two times is then guided by the circulator 520 to flow towards the second fiber amplifying unit 512. At this time, residual light is supplied to the second fiber amplifying unit 512 as a pumping light. Accordingly, the amplified/dispersion-compensated optical signal is amplified while passing through the second fiber amplifying unit 512, and then outputted to the output stage. An isolator 538 is arranged downstream from the second fiber amplifying unit 512 in order to make the amplified/dispersion-compensated optical signal flow forward. Another isolator 536 is arranged upstream from the first fiber amplifying unit 510 in order to prevent backward flowing of optical signals while making those optical signals flow forward.

As apparent from the above description, the present invention provides a dispersion-compensated erbium-doped fiber amplifier which can be effectively used in an optical transmission system using a transmission rate of 10 Gb/s or more. The fiber amplifier of the present invention can be manufactured using a simplified manufacturing process while using a reduced number of optical elements, thereby achieving a reduction in manufacturing costs. In addition, the overall configuration of the optical transmission system is simplified.

While this invention has been described in connection with what is presently considered to be a preferred embodiments, it is to be understood that the invention is not limited to the disclosed embodiments, but it is intended to cover various modifications within the spirit and scope of the appended claims.

What is claimed is:

1. A dispersion-compensated erbium-doped fiber amplifier comprising:

a first fiber amplifying unit having a first erbium-doped fiber;

a second fiber amplifying unit having a second erbium-doped fiber, arranged downstream from the first fiber amplifying unit while being connected in series to the first fiber amplifying unit;

means for reusing a residual light, remaining after an amplification operation of the first fiber amplifying unit, as a pumping light for the second fiber amplifying unit;

a fiber reflector for reflecting an optical signal amplified by the second fiber amplifying unit, thereby causing the reflected optical signal to flow backward towards the second fiber amplifying unit;

a circulator for guiding the amplified optical signal, reflected to flow backward by the fiber reflector, to flow along a path different from that of the amplified optical signal applied to the circulator, while preventing an amplified spontaneous emission generated during an amplification operation of the second fiber amplifying unit from flowing backward towards the first fiber amplifying unit;

a dispersion compensating fiber for dispersion-compensating the reflected optical signal, the dispersion compensating fiber being disposed between the circulator and the second fiber amplifying unit, and adapted to compensate for dispersion of the amplified optical signal, wherein, a signal-to-noise ratio based on Rayleigh back-scattering is maximized.

2. The dispersion-compensated erbium-doped amplifier according to claim 1, wherein said means for re-using is an optical fiber connected in parallel between the first and second fiber amplifying unit.

3. The dispersion-compensated erbium-doped amplifier according to claim 2, wherein a pumping laser diode is a pumping light source for the first amplifying unit.

4. The dispersion-compensated erbium-doped amplifier according to claim 1, wherein a pumping laser diode is a pumping light source for the first amplifying unit.

5. The dispersion-compensated erbium-doped fiber amplifier according to claim 1, wherein the dispersion compensating fiber compensates for dispersion of a forward optical signal amplified by the first fiber amplifying unit, while compensating for dispersion of the backward optical signal reflected to flow backward by the fiber reflector.

6. The dispersion-compensated erbium-doped fiber amplifier according to claim 2, wherein the optical fiber is connected in parallel between the first and second fiber amplifying units via a first and second of wavelength selective coupler respectively connected between the first fiber amplifying unit and the circulator and between the dispersion compensating fiber and the second fiber amplifying unit.

7. The dispersion-compensated erbium-doped fiber amplifier according to claim 1, wherein the fiber reflector has full-reflection characteristics with respect to optical signals applied thereto.

8. A dispersion-compensated erbium-doped fiber amplifier comprising:

a first fiber amplifying unit having a first erbium-doped fiber;

a second fiber amplifying unit having a second erbium-doped fiber and arranged downstream from the first fiber amplifying unit while being connected in series to the first fiber amplifying unit;

means for re-using a residual light, remaining after an amplification operation of the first fiber amplifying unit, as a pumping light for the second fiber amplifying unit;

a fiber reflector for reflecting an optical signal amplified in the second fiber amplifying unit, thereby causing the reflected optical signal to flow backward towards the second fiber amplifying unit;

a circulator for separating the amplified optical signal, reflected to flow backward by the fiber reflector and dispersion-compensated by a dispersion compensating fiber, to flow towards an output stage, along a path different from that of the amplified optical signal applied to the circulator, while preventing an amplified spontaneous emission generated during an amplification operation of the second fiber amplifying unit from flowing backward towards the first fiber amplifying unit, the dispersion compensating fiber being disposed between the second fiber amplifying unit and the fiber reflector, and adapted to compensate for dispersion of a forward optical signal amplified by the first fiber amplifying unit while compensating again for dispersion of the optical signal reflected to flow backward by the fiber reflector.

9. The dispersion-compensated erbium-doped amplifier according to claim 8, wherein said means for re-using is an optical fiber connected in parallel between the first and second fiber amplifying unit.

10. The dispersion-compensated erbium-doped amplifier according to claim 8, wherein a pumping laser diode is a pumping light source for the first amplifying unit.

11. The dispersion-compensated erbium-doped amplifier according to claim 10, wherein a pumping laser diode is a pumping light source for the first amplifying unit.

12. The dispersion-compensated erbium-doped fiber amplifier according to claim 9, wherein the optical fiber is connected in parallel between the first and second fiber amplifying unit via a first and second wavelength selective coupler respectively disposed between the first fiber amplifying unit and the circulator and between the circulator and the second fiber amplifying unit.

13. A dispersion-compensated erbium-doped fiber amplifier comprising:

a first fiber amplifying unit having a first erbium-doped fiber;

a second fiber amplifying unit having a second erbium-doped fiber and arranged downstream from the first fiber amplifying unit while being connected in series to the first fiber amplifying unit;

a third fiber amplifying unit arranged downstream from the second fiber amplifying unit while being connected in series to the second fiber amplifying unit;

means for re-using a residual light, remaining after an amplification operation of the second fiber amplifying unit, as a pumping light for the third fiber amplifying unit; and a fiber reflector arranged downstream from the third fiber amplifying unit, and adapted to reflect an optical signal amplified in the third fiber amplifying unit and dispersion-compensated by a dispersion compensating fiber, thereby causing the reflected optical signal to flow backward towards the third fiber amplifying unit;

a circulator arranged between the first and second fiber amplifying units, and adapted to separate the amplified/dispersion-compensated optical signal, reflected to flow backward by the fiber reflector, and cause the separated optical signal to flow towards an output stage along a path different from that of the amplified/dispersion-compensated optical signal applied to the circulator while preventing an amplified spontaneous emission generated during an amplification operation of the second fiber amplifying unit from flowing backward towards the first fiber amplifying unit, the dispersion compensating fiber disposed between the first and second wavelength selective coupler and adapted to compensate for dispersion of a forward optical signal amplified by the second fiber amplifying unit while compensating again for dispersion of the amplified/dispersion-compensated optical signal flowing backward towards the third fiber amplifying unit.

14. The dispersion-compensated erbium-doped fiber amplifier according to claim 13, wherein the means for re-using is an optical fiber connected in parallel between the second and third fiber amplifying unit via a first and second wavelength selective coupler.

15. The dispersion-compensated erbium-doped fiber amplifier according to claim 14, wherein the first and second wavelength selective coupler are disposed between the second fiber amplifying unit and the dispersion compensating fiber and between the dispersion compensating fiber and the third fiber amplifying unit, respectively.

16. The dispersion-compensated erbium-doped amplifier according to claim 13, wherein a pumping laser diode is a pumping light source for the first amplifying unit.

17. The dispersion-compensated erbium-doped amplifier according to claim 14, wherein a pumping laser diode is a pumping light source for the first amplifying unit.

18. A dispersion-compensated erbium-doped fiber amplifier comprising:

a first fiber amplifying unit having a first erbium-doped fiber;

a second fiber amplifying unit having a second erbium-doped fiber, arranged downstream from the first fiber amplifying unit while being connected in series to the first fiber amplifying unit;

means for re-using a residual light, remaining after an amplification operation of the first fiber amplifying unit, as a pumping light for the second fiber amplifying unit;

a fiber reflector adapted to reflect an optical signal amplified in the first fiber amplifying unit and dispersion-compensated by a dispersion compensating fiber, thereby causing the reflected optical signal to flow backward towards the second fiber amplifying unit; and a circulator arranged between the first and second wavelength selective coupler and adapted to separate the amplified/dispersion-compensated optical signal, reflected to flow backward by the fiber reflector, to flow towards an output stage along a path different from that of the amplified/dispersion-compensated optical signal applied to the circulator, while preventing an amplified spontaneous emission generated during an amplification operation of the second fiber amplifying unit from flowing backward towards the first fiber amplifying unit, the dispersion compensating fiber being arranged between the circulator and the reflector, and adapted to compensate for dispersion of the amplified optical signal applied thereto while compensating again for dispersion of the amplified/dispersion-compensated optical signal flowing backward by the reflector, wherein, a reduction in Rayleigh back-scattering while obtaining a high gain is achieved.

19. The dispersion-compensated erbium-doped fiber amplifier according to claim 18, wherein the means for re-using is an optical fiber connected in parallel between the first and second fiber amplifying unit via a first and second wavelength selective coupler.

20. The dispersion-compensated erbium-doped fiber amplifier according to claim 18, wherein the first and second wavelength selective coupler are disposed between the first fiber amplifying unit and the circulator and between the circulator and the second fiber amplifying unit, respectively.

21. The dispersion-compensated erbium-doped fiber amplifier according to claim 18, further comprising an isolator arranged downstream from the second fiber amplifying unit.

* * * * *